United States Patent [19]

Fujii

[11] 4,264,137
[45] Apr. 28, 1981

[54] COMPACT RETROFOCUS TYPE LENS SYSTEM

[75] Inventor: Toru Fujii, Hino, Japan

[73] Assignee: Olympus Optical Co., Ltd., Tokyo, Japan

[21] Appl. No.: 12,480

[22] Filed: Feb. 15, 1979

[30] Foreign Application Priority Data

Mar. 1, 1978 [JP] Japan .................................. 53-22064

[51] Int. Cl.³ .............................................. G02B 9/64
[52] U.S. Cl. .................................................... 350/464
[58] Field of Search .............................. 350/214, 176

[56] References Cited

U.S. PATENT DOCUMENTS

| | | | |
|---|---|---|---|
| 3,832,037 | 8/1974 | Nakagawa | 350/214 |
| 3,976,365 | 8/1976 | Nakagawa | 350/214 |
| 4,008,952 | 2/1977 | Nakagawa | 350/215 |

FOREIGN PATENT DOCUMENTS

| | | |
|---|---|---|
| 1187393 | 2/1965 | Fed. Rep. of Germany . |
| 1220164 | 6/1966 | Fed. Rep. of Germany . |
| 51-237151 | 1/1976 | Japan . |
| 51-602176 | 1/1976 | Japan . |
| 931063 | 7/1963 | United Kingdom . |
| 962368 | 7/1964 | United Kingdom . |

*Primary Examiner*—Paul A. Sacher
*Attorney, Agent, or Firm*—Cushman, Darby & Cushman

[57] ABSTRACT

A compact retrofocus type lens system having a first lens component of a positive meniscus lens with its convex surface facing the object side, second and third lens components of negative meniscus lenses with their convex surfaces both facing the object side, a fourth lens component of a positive meniscus lens with its convex surface facing the object side, a fifth lens component of a biconvex lens, a sixth lens component of a biconcave lens, a seventh lens component of a positive meniscus lens with its convex surface facing the image side and an eighth lens component of a positive meniscus lens with its convex surface facing the image side. This lens system is so arranged that the lateral chromatic aberration is made small by increasing the Abbe number of the first lens component and also that the Petzval sum which is deteriorated thereby is corrected by increasing the refractive index of the fourth lens component.

3 Claims, 5 Drawing Figures

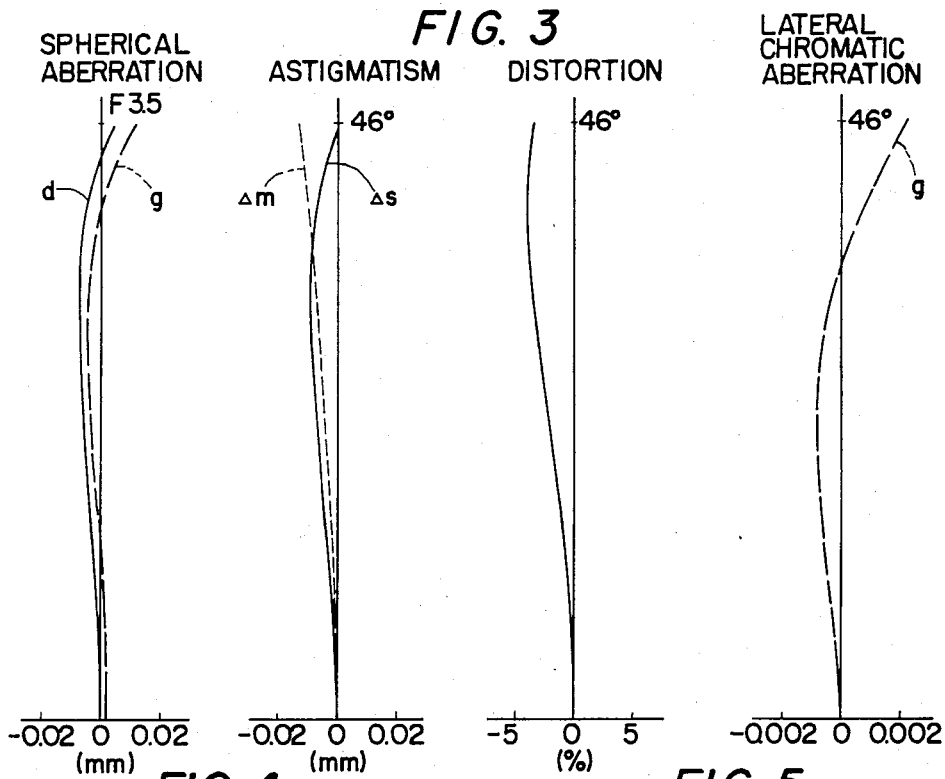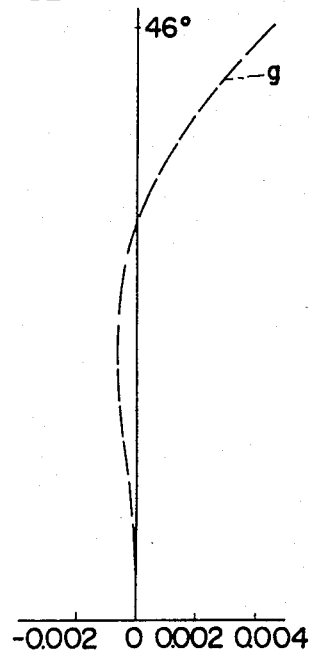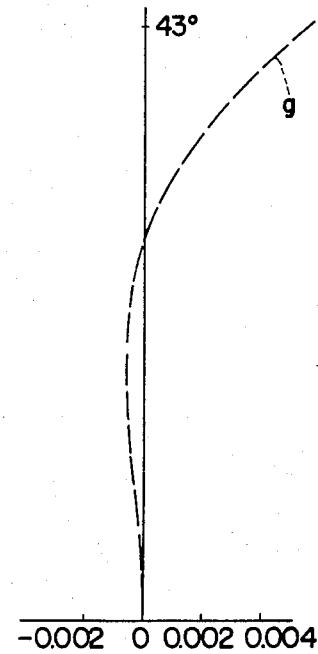

COMPACT RETROFOCUS TYPE LENS SYSTEM

BACKGROUND OF THE INVENTION (a) Field of the invention

The present invention relates to a compact retrofocus type lens system.

(b) Description of the prior art

Among the conventional retrofocus lens systems of the type as disclosed in the specification of Japanese Published Examined Patent Application No. 2371/76 (a corresponding patent being U.S. Pat. No. 3,832,037), there are ones in which the peripheral resolution is not satisfactory. The increase of the lateral chromatic aberration at the peripheral portions is the main cause of such an unsatisfactory peripheral resolution. For example, the lateral chromatic aberrations of the embodiments 1 and 2 given in the above identified publication are shown in FIG. 4 and FIG. 5, respectively. Thus, when the lateral chromatic aberration is large, the image at the peripheral portions is blurred. Unlike the blur of the image caused by the coma, the problem in the blur of the image mentioned above is not resolved even by making the aperture smaller.

SUMMARY OF THE INVENTION

The present invention provides a compact retrofocus type lens system, in which by modifying the lens system disclosed in the specification of Japanese Published Examined Patent Application No. 2371/76 (a corresponding patent being U.S. Pat. No. 3,832,037), the lateral chromatic aberration is more satisfactorily eliminated and the resolution of the image at the peripheral portion is improved.

The lens system according to the present invention comprises, similarly as in the conventional lens system as identified above, a first lens component of a positive meniscus lens with its convex surface facing the object side, second and third lens components of negative meniscus lenses with their convex surfaces both facing the object side, a fourth lens component of a positive meniscus lens with its convex surface facing the object side, a fifth lens component of a biconvex lens, a sixth lens component of a biconcave lens, a seventh lens component of a positive meniscus lens with its convex surface facing the image side and an eighth lens component of a positive meniscus lens with its convex surface facing the image side. In order to eliminate the problem that has existed in the above mentioned retrofocus type lens system, the present lens system is so arranged that the lateral chromatic aberration is made small by increasing the Abbe number $\nu_1$ of the first lens component and also that the Petzval sum which is deteriorated thereby is corrected by increasing the refractive index $n_4$ of the fourth lens component. The present invention enables achievement of sufficient correction of the various aberrations including the lateral chromatic aberration by arranging that the following conditions including those conditions relating to the Abbe number $\nu_1$ and the refractive index $n_4$ are satisfied:

(1) $\nu_1 > 60$
(2) $n_2, n_3 > 1.65, n_4 > 1.75$
(3) $\nu_4 > 30$
(4) $f > r_8 > 30f$
(5) $3.5f < f_1 < 5f$
(6) $0.4f < |f_{23}| < 0.6f, f_{23} < 0$
(7) $0.7f < f_{45} < 0.8f$
(8) $0.8f < |f_6| < 0.95f$
(9) $0.2f < d_{11} < 0.3f$
(10) $0.5f < d_7 + d_9 < 0.65f$

In the lens system arranged as above, the first lens component causes the occurrence of positive lateral chromatic aberration and the second and third lens components cause the occurrence of negative lateral chromatic aberration. Especially, it has been discovered that the lateral chromatic aberration of the first lens component markedly increases as the angle of view increases and, therefore, the increase of the Abbe number of the first lens component as shown in the condition (1) is extremely effective in the correction of the lateral chromatic aberration. Outside of this condition (1), the difference of the lateral chromatic aberrations at different angles of view becomes too large so that, when an attempt is made to make smaller the lateral chromatic aberration with respect to the ray of light having a small angle of view, there is an increase in the positive lateral chromatic aberration with respect to the ray of light having a large angle of view.

When the Abbe number of the first lens component is arranged to satisfy the condition (1), its refractive index must be made small and, thus, the Petzval sum unavoidably becomes worse. The condition for the purpose of correcting this is the condition (2). When any of the refractive indices $n_2$, $n_3$ and $n_4$ of the second, third and fourth lens components is outside of the condition (2), the Petzval sum cannot be kept to about 0.1 and the curvature of field is increased.

Further, the condition (3) is necessary in order to keep the paraxial chromatic aberration in balance in addition to satisfying the above conditions (1) and (2). When the Abbe number $\nu_4$ of the fourth lens component is outside of the condition (3), the paraxial chromatic aberration becomes over-corrected.

Under the condition (3), the fourth lens component unavoidably having a high refractive index satisfies the condition (2) and the Petzval sum becomes small. However, when the refractive index of this lens component becomes high, the spherical aberration becomes under-corrected. Therefore, it is necessary to maintain the Petzval sum small and to make the spherical aberration under-corrected by having the radius of curvature $r_8$ of the surface of the fourth lens component at the image side satisfy the condition (4). When the lower limit of the condition (4) is exceeded, the effect of the condition (2) for the purpose of making the Petzval sum small is too weak and the curvature of field increases. When the upper limit is exceeded, the spherical aberration becomes under-corrected.

The condition (5) is primarily for the purpose of correcting the chromatic aberration and the distortion. When the lower limit of this condition is exceeded, a positive distortion and an inner coma occur, and when the upper limit thereof is exceeded, a negative distortion and an outer coma occur.

When the lower limit of the condition (6) is exceeded, the power of the front lens group becomes too strong causing the deterioration of the various aberrations, especially coma, which is difficult to eliminate. When the upper limit is exceeded, the occurrence of the aberrations of the negative lens group is small but it becomes impossible to construct the total lens system small and compact.

The conditions (7) and (8) are both for maintaining the back focus long and further the condition (7) is for eliminating the coma flare. When the lower limit of the condition (7) is exceeded, the back focus becomes short and moreover the coma is deteriorated. When the upper limit is exceeded, the back focus becomes long but the coma and the spherical aberration become under-corrected.

The condition (8) is established for making the back focus long and for eliminating the astigmatism. When the lower limit of this condition is exceeded, the astigmatism with respect to the ray of light having a large angle of view becomes large, causing the occurrence of excessive over-correction of the astigmatism. When the upper limit is exceeded, the back focus becomes insufficient and the spherical aberration becomes under-corrected.

The conditions (9) and (10) are those relating to the astigmatism and coma.

When the lower limit of the condition (9) is exceeded, the spherical aberration and the astigmatism become under-corrected and when the upper limit is exceeded, these aberrations become over-corrected, which can not be corrected by other means.

When the lower limit of the condition (10) is exceeded, the back focus becomes short and the coma is deteriorated. When the upper limit is exceeded, the astigmatism increases and the coma, especially the aberration by the upper side of the oblique beam flux, cannot be corrected.

Further, objects and advantages will be apparent in the arrangements as set forth in the following specification taken together with the accompanying drawings.

DESCRIPTION OF THE DRAWINGS

FIGS. 2 and 3 show graphs illustrating conditions of aberrations of the embodiments 1 and 2 of the present invention, respectively.

FIGS. 4 and 5 show graphs illustrating lateral chromatic aberration with respect of embodiments of a conventional retrofocus type lens system.

DESCRIPTION OF THE PREFERRED EMBODIMENTS

Figure 1:
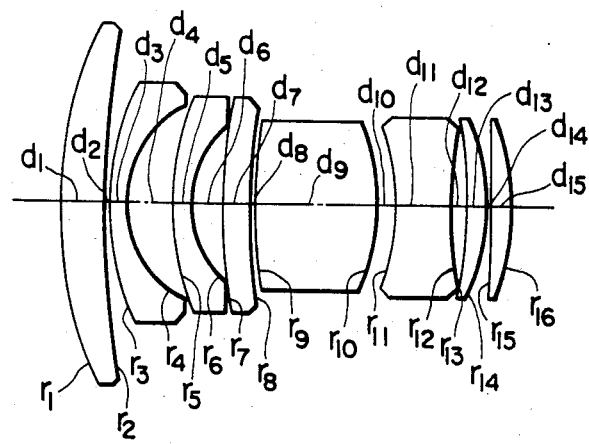
FIG. 1 shows a sectional view of the lens system according to the present invention.

Some preferred embodiments of the present invention relating to the retrofocus type lens system as described above are given below:

| Embodiment 1 | | | |
|---|---|---|---|
| $r_1 = 1.60845$ | | | |
| | $d_1 = 0.1865$ | $n_1 = 1.56873$ | $\nu_1 = 63.2$ |
| $r_2 = 4.18103$ | | | |
| | $d_2 = 0.0056$ | | |
| $r_3 = 0.96881$ | | | |
| | $d_3 = 0.0699$ | $n_2 = 1.691$ | $\nu_2 = 54.8$ |
| $r_4 = 0.42106$ | | | |
| | $d_4 = 0.1865$ | | |
| $r_5 = 1.21657$ | | | |
| | $d_5 = 0.0699$ | $n_3 = 1.691$ | $\nu_3 = 54.8$ |
| $r_6 = 0.43682$ | | | |
| | $d_6 = 0.1259$ | | |
| $r_7 = 1.69992$ | | | |
| | $d_7 = 0.1072$ | $n_4 = 1.80518$ | $\nu_4 = 25.4$ |
| $r_8 = 4.66243$ | | | |
| | $d_8 = 0.0056$ | | |
| $r_9 = 1.61670$ | | | |
| | $d_9 = 0.5129$ | $n_5 = 1.59551$ | $\nu_5 = 39.2$ |
| $r_{10} = -0.70561$ | | | |
| | $d_{10} = 0.0769$ | | |
| $r_{11} = -1.11446$ | | | |
| | $d_{11} = 0.2191$ | $n_6 = 1.84666$ | $\nu\nu_6 = 23.9$ |
| $r_{12} = 2.97617$ | | | |

-continued

| Embodiment 1 | | | |
|---|---|---|---|
| | $d_{12} = 0.0326$ | | |
| $r_{13} = -2.11409$ | | | |
| | $d_{13} = 0.0932$ | $n_7 = 1.617$ | $\nu_\nu = 62.8$ |
| $r_{14} = -0.66761$ | | | |
| | $d_{14} = 0.0056$ | | |
| $r_{15} = -9.75334$ | | | |
| | $d_{15} = 0.0932$ | $n_8 = 1.617$ | $\nu_\nu = 62.8$ |
| $r_{16} = -0.98634$ | | | |
| | $f = 1.0$ | $f_1 = 4.479$ | $f_6 = -0.935$ |
| | $f_{23} = -0.489$ | $f_{45} = 0.768$ | |

| Embodiment 2 | | | |
|---|---|---|---|
| $r_1 = 1.59211$ | | | |
| | $d_1 = 0.1856$ | $n_1 = 1.62041$ | $\nu_1 = 60.3$ |
| $r_2 = 3.44646$ | | | |
| | $d_2 = 0.0046$ | | |
| $r_3 = 0.90791$ | | | |
| | $d_3 = 0.0696$ | $n_2 = 1.6583$ | $\nu_2 = 57.3$ |
| $r_4 = 0.38145$ | | | |
| | $d_4 = 0.2098$ | | |
| $r_5 = 1.08365$ | | | |
| | $d_5 = 0.0696$ | $n_3 = 1.713$ | $\nu_3 = 53.9$ |
| $r_6 = 0.50032$ | | | |
| | $d_6 = 0.1132$ | | |
| $r_7 = 1.75845$ | | | |
| | $d_7 = 0.2251$ | $n_4 = 1.7552$ | $\nu_4 = 27.5$ |
| $r_8 = 27.9070$ | | | |
| | $d_8 = 0.0070$ | | |
| $r_9 = 6.47938$ | | | |
| | $d_9 = 0.3550$ | $n_5 = 1.61659$ | $\nu_5 = 36.6$ |
| $r_{10} = -0.67563$ | | | |
| | $d_{10} = 0.0743$ | | |
| $r_{11} = -1.03258$ | | | |
| | $d_{11} = 0.2506$ | $n_6 = 1.84666$ | $\nu_6 = 23.9$ |
| $r_{12} = 2.69265$ | | | |
| | $d_{12} = 0.0510$ | | |
| $r_{13} = -3.14093$ | | | |
| | $d_{13} = 0.0849$ | $n_7 = 1.618$ | $\nu_7 = 63.4$ |
| $r_{14} = -0.71801$ | | | |
| | $d_{14} = 0.0070$ | | |
| $r_{15} = -8.39036$ | | | |
| | $d_{15} = 0.1369$ | $n_8 = 1.618$ | $\nu_8 = 63.4$ |
| $r_{16} = -0.94081$ | | | |
| | $f = 1.0$ | $f_1 = 4.332$ | $f_6 = -0.859$ |
| | $f_{23} = -0.521$ | $f_{45} = 0.774$ | | wherein the reference symbols $r_1$ through $r_{16}$ represent the radii of curvature of the respective lens surfaces, the symbols $d_1$ through $d_{15}$ represent the axial thicknesses of the respective lenses and axial air spaces between the lenses, the symbols $n_1$ through $n_8$ represent the refractive indices of the respective lenses and the symbols $\nu_1$ through $\nu_8$ represent the Abbe numbers of the respective lenses, respectively.

Figure 2:
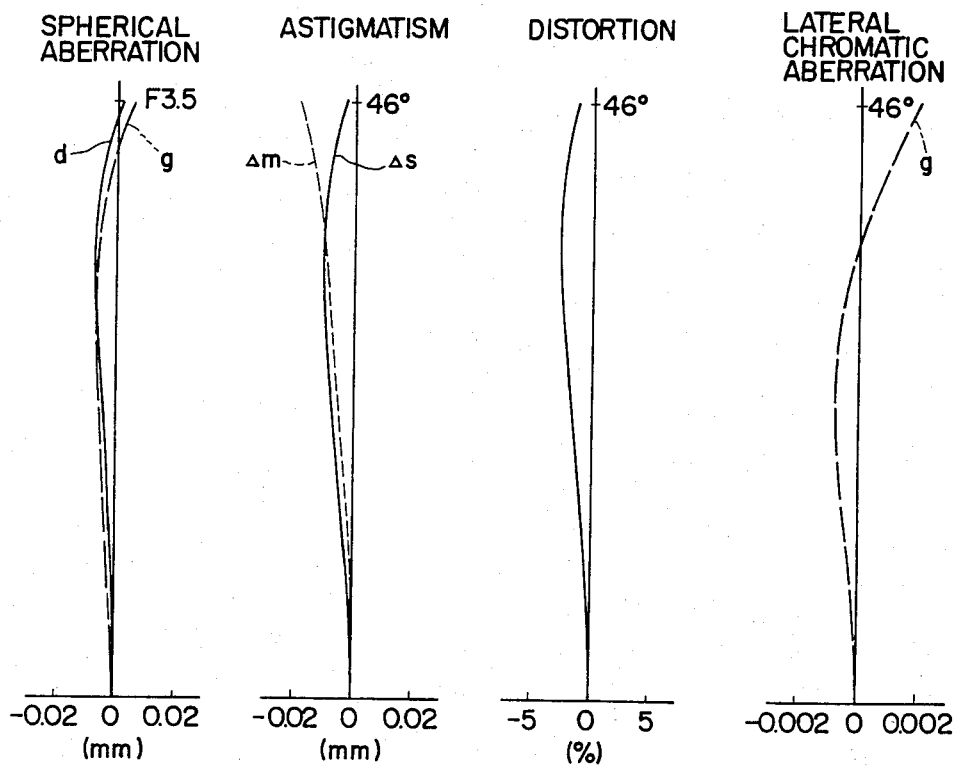

As described and explained above, the retrofocus type lens system of the present invention enables achievement of good correction of the lateral chromatic aberration. It is apparent from the aberration curves of the embodiments of the present invention as shown in FIGS. 2 and 3 that the aberrations of the embodiments of the present invention are less than half the values of those shown in FIGS. 4 and 5 of Japanese Published Examined Patent Application No. 2371/76 (a corresponding patent being U.S. Pat. No. 3,832,037). Further, other aberrations have also been well-corrected.

I claim:

1. A compact retrofocus type lens system comprising a first lens component of a positive meniscus lens with its convex surface facing the object side, a second lens component of a negative meniscus lens with its convex surface facing the object side, a third lens component of a negative meniscus lens with its convex surface facing the object side, a fourth lens component of a positive meniscus lens with its convex surface facing the object side, a fifth lens component of a biconvex lens, a sixth lens component of a biconcave lens, a seventh lens component of a positive meniscus lens with its convex surface facing the image side and an eighth lens component of a positive meniscus lens with its convex surface facing the image side, the said lens system satisfying the following conditions:

(1) $60 < \nu_1 < 64$
(2) $1.65 < n_2 < 1.70$
    $1.69 < n_3 < 1.72$
    $1.75 < n_4 < 1.81$
(3) $25 < \nu_4 < 28$
(4) $4.6f < r_8 < 28f$
(5) $4.3f < f_1 < 4.5f$
(6) $0.48f < |f_{23}| < 0.53f$
(7) $0.76f < f_{45} < 0.78f$
(8) $0.85f < |f_6| < 0.94f$
(9) $0.21f < d_{11} < 0.26f$
(10) $0.58f < d_7 + d_9 < 0.63f$ wherein the reference symbol f represents the focal length of the total lens system, the symbol $f_1$ represents the focal length of the first lens component, the symbol $f_{23}$ represents the composite focal length of the second and third lens components, the symbol $f_{45}$ represents the composite focal length of the fourth and fifth lens components, the sumbol $f_6$ represents the focal length of the sixth lens component, the symbols $n_2$, $n_3$ and $n_4$ represent the refractive indices of the second, third and fourth lens components, the symbols $\nu_1$ and $\nu_4$ represent the Abbe numbers of the first and fourth lens components, the symbol $r_8$ represents the radius of curvature of the lens surface on the image side of the fourth lens component and the symbols $d_7$, $d_9$ and $d_{11}$ represent the axial thicknesses of the fourth, fifth and sixth lens components, respectively.

2. A compact retrofocus type lens system according to claim 1, having the following data:

| | | | |
|---|---|---|---|
| $r_1 = 1.60845$ | | | |
| | $d_1 = 0.1865$ | $n_1 = 1.56873$ | $\nu_1 = 63.2$ |
| $r_2 = 4.18103$ | | | |
| | $d_2 = 0.0056$ | | |
| $r_3 = 0.96881$ | | | |
| | $d_3 = 0.0699$ | $n_2 = 1.691$ | $\nu_2 = 54.8$ |
| $r_4 = 0.42106$ | | | |
| | $d_4 = 0.1865$ | | |
| $r_5 = 1.21657$ | | | |
| | $d_5 = 0.0699$ | $n_3 = 1.691$ | $\nu_3 = 54.8$ |
| $r_6 = 0.43682$ | | | |
| | $d_6 = 0.1259$ | | |
| $r_7 = 1.69992$ | | | |
| | $d_7 = 0.1072$ | $n_4 = 1.80518$ | $\nu_4 = 25.4$ |
| $r_8 = 4.66243$ | | | |
| | $d_8 = 0.0056$ | | |
| $r_9 = 1.61670$ | | | |
| | $d_9 = 0.5129$ | $n_5 = 1.59551$ | $\nu_5 = 39.2$ |
| $r_{10} = -0.70561$ | | | |
| | $d_{10} = 0.0769$ | | |
| $r_{11} = -1.11446$ | | | |
| | $d_{11} = 0.2191$ | $n_6 = 1.84666$ | $\nu_6 = 23.9$ |
| $r_{12} = 2.97617$ | | | |
| | $d_{12} = 0.0326$ | | |
| $r_{13} = -2.11409$ | | | |
| | $d_{13} = 0.0932$ | $n_7 = 1.617$ | $\nu_7 = 62.8$ |
| $r_{14} = -0.66761$ | | | |
| | $d_{14} = 0.0056$ | | |
| $r_{15} = -9.75334$ | | | |
| | $d_{15} = 0.0932$ | $n_8 = 1.617$ | $\nu_8 = 62.8$ |
| $r_{16} = -0.98634$ | | | |
| | $f = 1.0$ | $f_1 = 4.479$ | $f_6 = -0.935$ |
| | $f_{23} = -0.489$ | $f_{45} = 0.768$ | | wherein the reference symbols $r_1$ through $r_{16}$ represent the radii of curvature of the respective lens surfaces, the symbols $d_1$ through $d_{15}$ represent the axial thicknesses of the respective lenses and axial air spaces between the lenses, the symbols $n_1$ through $n_8$ represent the refractive indices of the respective lenses and the symbols $\nu_1$ through $\nu_8$ represent the Abbe numbers of the respective lenses, respectively.

3. A compact retrofocus type lens system according to claim 1, having the following data:

| | | | |
|---|---|---|---|
| $r_1 = 1.59211$ | | | |
| | $d_1 = 0.1856$ | $n_1 = 1.62041$ | $\nu_1 = 60.3$ |
| $r_2 = 3.44646$ | | | |
| | $d_2 = 0.0046$ | | |
| $r_3 = 0.90791$ | | | |
| | $d_3 = 0.0696$ | $n_2 = 1.6583$ | $\nu_2 = 57.3$ |
| $r_4 = 0.38145$ | | | |
| | $d_4 = 0.2098$ | | |
| $r_5 = 1.08365$ | | | |
| | $d_5 = 0.0696$ | $n_3 = 1.713$ | $\nu_3 = 53.9$ |
| $r_6 = 0.50032$ | | | |
| | $d_6 = 0.1132$ | | |
| $r_7 = 1.75845$ | | | |
| | $d_7 = 0.2251$ | $n_4 = 1.7552$ | $\nu_4 = 27.5$ |
| $r_8 = 27.9070$ | | | |
| | $d_8 = 0.0070$ | | |
| $r_9 = 6.47938$ | | | |
| | $d_9 = 0.3550$ | $n_5 = 1.61659$ | $\nu_5 = 36.6$ |
| $r_{10} = -0.67563$ | | | |
| | $d_{10} = 0.0743$ | | |
| $r_{11} = -1.03258$ | | | |
| | $d_{11} = 0.2506$ | $n_6 = 1.84666$ | $\nu_6 = 23.9$ |
| $r_{12} = 2.69265$ | | | |
| | $d_{12} = 0.0510$ | | |
| $r_{13} = -3.14093$ | | | |
| | $d_{13} = 0.0849$ | $n_7 = 1.618$ | $\nu_7 = 63.4$ |
| $r_{14} = -0.71801$ | | | |
| | $d_{14} = 0.0070$ | | |
| $r_{15} = -8.39036$ | | | |
| | $d_{15} = 0.1369$ | $n_8 = 1.618$ | $\nu_8 = 63.4$ |
| $r_{16} = -0.94081$ | | | |
| | $f = 1.0$ | $f_1 = 4.332$ | $f_6 = -0.859$ |
| | $f_{23} = -0.521$ | $f_{45} = 0.774$ | | wherein the reference symbols $r_1$ through $r_{16}$ represent the radii of curvature of the respective lens surfaces, the symbols $d_1$ through $d_{15}$ represent the axial thicknesses of the respective lenses and axial air spaces between the lenses, the symbols $n_1$ through $n_8$ represent the refractive indices of the respective lenses and the symbols $\nu_1$ through $\nu_8$ represent the Abbe numbers of the respective lenses, respectively.

* * * * *